United States Patent [19]

Fenner, Jr.

[11] Patent Number: 5,423,342
[45] Date of Patent: Jun. 13, 1995

[54] TEMPERATURE COMPENSATING PRESSURE REGULATOR

[76] Inventor: Thomas C. Fenner, Jr., 8081 S. Kendall Blvd., Littleton, Colo. 80123

[21] Appl. No.: 60,377

[22] Filed: May 11, 1993

[51] Int. Cl.⁶ .............................................. F16K 17/38
[52] U.S. Cl. ........................................ 137/14; 137/79; 137/505.14
[58] Field of Search .................. 137/79, 505.14, 14

[56] References Cited

U.S. PATENT DOCUMENTS

| | | | |
|---|---|---|---|
| 1,236,953 | 8/1917 | Lewis | 137/505.14 |
| 4,883,082 | 11/1989 | Pirkle | 137/79 |
| 5,174,326 | 12/1992 | Steinert | 137/505.14 |

FOREIGN PATENT DOCUMENTS

| | | | |
|---|---|---|---|
| 0116667 | 8/1984 | European Pat. Off. | 137/79 |
| 1049870 | 10/1983 | U.S.S.R. | 137/79 |

OTHER PUBLICATIONS

"Miniature Regulator Type R14" Norgren, Littleton Colo., 1979.
"Wax Thermostatic Elements" Vernet, 91291 Arpajon Cedex France, 1990.

Primary Examiner—A. Michael Chambers
Attorney, Agent, or Firm—Gary M. Polumbus; Holland & Hart

[57] ABSTRACT

The temperature compensating pressure regulator (TCPR) allows a modified constant output pressure regulator to change its output pressure in response to changes in the ambient temperature. Furthermore, the changes in the ambient temperature are extrapolated to estimate the changes in a mass which is in the same ambient environment. The best mode teaches a beer keg application. A wax filled container expands in relation to the temperature changes in a cold storage room. The thermal expansion coefficient of the wax and impurities therein simulate the temperature changes in a keg of beer in the same cold storage room. Upon responding to a temperature change, the TCPR adjusts the keg pressure to the brewer's predetermined pressures, thereby maintaining the proper $CO_2$ solution in the beer.

8 Claims, 5 Drawing Sheets

TEMPERATURE (°F) OF BEER IN KEG

| ELEVATION OF ACCOUNT | 30 | 31 | 32 | 33 | 34 | 35 | 36 | 37 | 38 | 39 | 40 | 41 | 42 | 43 | 44 | 45 |
|---|---|---|---|---|---|---|---|---|---|---|---|---|---|---|---|---|
| 14,001-15,000 | 19 | 19 | 20 | 20 | 21 | 21 | 22 | 22 | 23 | 23 | 24 | 24 | 25 | 25 | 26 | 26 |
| 13,001-14,000 | 18 | 19 | 19 | 20 | 20 | 21 | 21 | 22 | 22 | 23 | 23 | 24 | 24 | 25 | 25 | 26 |
| 12,001-13,000 | 18 | 18 | 19 | 19 | 20 | 20 | 21 | 21 | 22 | 22 | 23 | 23 | 24 | 24 | 25 | 25 |
| 11,001-12,000 | 17 | 18 | 18 | 19 | 19 | 20 | 20 | 21 | 21 | 22 | 22 | 23 | 23 | 24 | 24 | 25 |
| 10,001-11,000 | 17 | 17 | 18 | 18 | 19 | 19 | 20 | 20 | 21 | 21 | 22 | 23 | 23 | 24 | 24 | 24 |
| 9,001-10,000 | 16 | 17 | 17 | 18 | 18 | 19 | 19 | 20 | 20 | 21 | 21 | 22 | 22 | 23 | 23 | 24 |
| 8,001-9,000 | 16 | 16 | 17 | 17 | 18 | 18 | 19 | 19 | 20 | 20 | 21 | 21 | 22 | 22 | 23 | 23 |
| 7,001-8,000 | 15 | 16 | 16 | 17 | 17 | 18 | 18 | 19 | 19 | 20 | 20 | 21 | 21 | 22 | 22 | 23 |
| 6,001-7,000 | 15 | 15 | 16 | 16 | 17 | 17 | 18 | 18 | 19 | 19 | 20 | 20 | 21 | 21 | 22 | 22 |
| 5,001-6,000 | 14 | 15 | 15 | 16 | 16 | 17 | 17 | 18 | 18 | 19 | 19 | 20 | 20 | 21 | 21 | 22 |
| 4,001-5,000 | 14 | 14 | 15 | 15 | 16 | 16 | 17 | 17 | 18 | 18 | 19 | 19 | 20 | 20 | 21 | 21 |
| 3,001-4,000 | 13 | 14 | 14 | 15 | 15 | 16 | 16 | 17 | 17 | 18 | 18 | 19 | 19 | 20 | 20 | 21 |
| 2,001-3,000 | 13 | 13 | 14 | 14 | 15 | 15 | 16 | 16 | 17 | 17 | 18 | 18 | 19 | 19 | 20 | 20 |
| 1,001-2,000 | 12 | 13 | 13 | 14 | 14 | 15 | 15 | 16 | 16 | 17 | 17 | 18 | 18 | 19 | 19 | 20 |
| SEA LEVEL 1-1,000 | 12 | 12 | 13 | 13 | 14 | 14 | 15 | 15 | 16 | 16 | 17 | 17 | 18 | 18 | 19 | 19 |
| -1,001-0 | 11 | 12 | 12 | 13 | 13 | 14 | 14 | 15 | 15 | 16 | 16 | 17 | 17 | 18 | 18 | 19 |

PRESSURE (POUNDS)

*Fig. 1*

TEMPERATURE COMPENSATING PRESSURE REGULATOR

FIELD OF INVENTION

The present invention relates to regulating gas pressure in response to changing environmental temperatures. This invention is especially significant for controlling draught beer flow.

BACKGROUND OF THE INVENTION

The present invention has been specifically invented to improve the control of dispensing draught beer in commercial establishments. However, other applications are possible including medical and any fluid or gas system which requires a linear or any predetermined relationship between temperature variations and pressure output.

In commercial establishments including bars and restaurants it is customary to store beer kegs inside walk-in cold storage refrigerators. These walk-in cold storage refrigerators can store many beer kegs of various brands. Pressurized $CO_2$ is used to pump the draught beer from the keg to the bar.

Draught beer contains $CO_2$ in solution. The two most common elements that affect $CO_2$ levels in draught beer are elevation and temperature. If too much $CO_2$ escapes from the draught beer during the pumping to the bar, then excessive foam is created, and the beer loses carbonation and becomes flat tasting. FIG. 1 shows one typical temperature and elevation compensation chart for one type of draught beer. The idea is to maintain the $CO_2$ solution in the beer during pumping regardless of temperature variations in the cold storage refrigerator. $CO_2$ pressures in draught beer range between 11 psi and 26 psi depending on the brewer. The problem as yet unsolved in the art is how to properly compensate for temperature fluctuations caused by opening the door and from moving food stuffs at various temperatures in and out of the cold storage refrigerator.

FIG. 2 shows a layout of a walk-in refrigerator having a hypothetical computer controlled temperature compensated pressure regulating system. It is not economically feasible to install this system in a cold storage room. However, it is helpful to describe the functioning of the present invention by starting with a computer system model. This computer system computes the air temperature in the cold storage refrigerator and calculates the duration of time of any deviations from the norm. Then an algorithm is executed which simulates the temperature change of the beer (in nominally one half keg) during the measured temperature and time deviation of the ambient air in the cold storage refrigerator. Finally, a new pressure is calculated per the table in FIG. 1, and a new pressure is set on the pressure regulating valve to the keg. This computerized method of pressure compensation is too expensive since it requires a computer control loop.

Another known solution is to insert a temperature sensor directly into the keg. This method is also very expensive since it requires an approved probe in contact with publicly consumed beverages. It also requires bacteria and leak proof seals into the keg.

The present invention provides the same efficiency as the computer control loop noted above. However, the result is accomplished with an inexpensive temperature compensated pressure regulator valve. The basic principle uses a common pressure regulator valve having a temperature compensating adapter. The adapter has a closed compartment which encases an expandable fluid such as wax. When the wax expands during a rise in the ambient air temperature, it forces a piston down into the pressure regulator, thereby altering the spring tension in the regulator and increasing the output pressure. The closed compartment size, the thermal mass of the wax and the spring tension in the common regulator are designed to linearly compensate for a given volume of beer (nominally half a keg) over a set temperature range (30°–40° F.). The relationships described in FIG. 1 are maintained.

Thus, the control results of a costly computer system are duplicated in an inexpensive mechanical pressure regulator.

SUMMARY OF THE INVENTION

The main object of the present invention is to provide a simple mechanical temperature compensated pressure reducing regulator.

Another object of the present invention is to provide a means for adjusting the calibration of the pressure regulator to match various thermal masses of different substances including draught beer.

Other objects of this invention will appear from the following description and appended claims, referenced being had to the accompanying drawings forming a part of this specification wherein like reference characters designate corresponding parts in the several views.

The best mode of the present invention is embodied in a temperature compensated pressure reducing regulator placed between a $CO_2$ tank and a keg of draught beer in a walk-in refrigerator. An assembly consisting of a container of wax mixed with copper impurities and an extending piston (available from Vernet ®, 91291 Arpajon Cedex, France) is mounted atop a traditional pressure reducing miniature regulator (Norgren Type R14 or R16). The extending piston pushes on the main pressure control spring of the miniature regulator. The mixture of the wax and copper has been selected to match the lag time between the change in air temperature in the walk-in refrigerator in the range of 30°–40° F. and the change in the temperature of half a keg of draught beer. The movement of the extending piston is matched to the proper pressure control spring in the miniature regulator to maintain the variables specified in the chart of FIG. 1.

BRIEF DESCRIPTION OF THE DRAWINGS

FIG. 1 is a chart of temperature and elevation changes versus pressure adjustment for maintaining the proper $CO_2$ solution in a brand of draught beer.

DETAILED DESCRIPTION

FIG. 1 shows how the pressure in a keg of beer must be increased in relation to either an increase in elevation or temperature. The required increase in keg pressure is necessary to keep the $CO_2$ in the beer. When the temperature rises the $CO_2$ expands and separates out of the beer. This leaves a flat taste in the beer and causes excessive foam. The darkened lines show that at sea level and at a temperature of 38° F., the pressure in the keg should be 16 p.s.i. Therefore, if the beer temperature rises to 40° F. due to the door opening to the cold storage room having the keg of beer, then the keg pressure must rise to 17 p.s.i.

Figure 2:
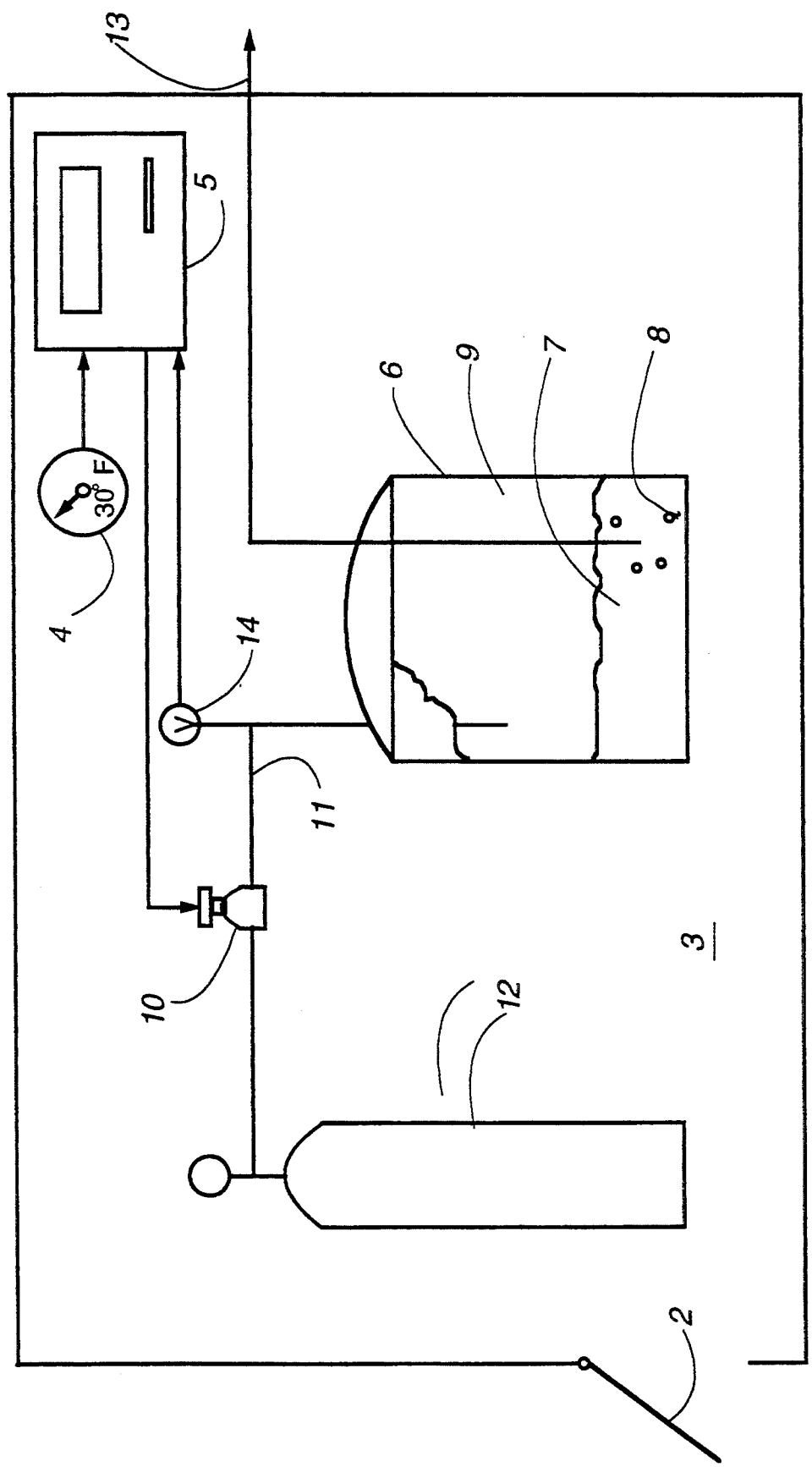
FIG. 2 is a block diagram of a known computer based method of controlling the pressure in the key for temperature changes of the air surrounding a keg of beer.

Referring next to FIG. 2, a computer controlled solution is housed in walk-in refrigerator 1. Opening door 2 causes a rise in the temperature of ambient air 3. This rise in temperature is sensed by sensor 4 and relayed to computer 5. Computer 5 then executes an algorithm which solves the following algorithm:

$$\Delta X = K^{(A,B)} \Delta T$$

K can be tailored by altering the thermal sensing media to emulate the thermal mass of a wide variety of materials. X is the pressure in the keg. $K^{(A,B)}$ may be a linear, non-linear, or adjustable time constant.

This equation estimates the temperature of the beer based on the change in temperature in the ambient air 3 as sensed by temperature sensor 4.

In operation the $CO_2$ tank 12 pressurizes the pressure cavity 9 in the beer keg 6 through $CO_2$ pipe 11. A pressure sensor 14 sends the measured pressure cavity pressure to the computer 5. The computer 5 estimates the beer temperature based on readings from the ambient air temperature gauge 4. Then the computer 5 controls the pressure regulating valve 10 to meet the predetermined proper pressure as defined by the chart in FIG. 1. The result is that the $CO_2$ 8 remains in solution in the beer 7 even with temperature fluctuations in the ambient air 3. Thus, the draught beer output 13 remains tasty, not flat, and not too foamy.

Figure 3:
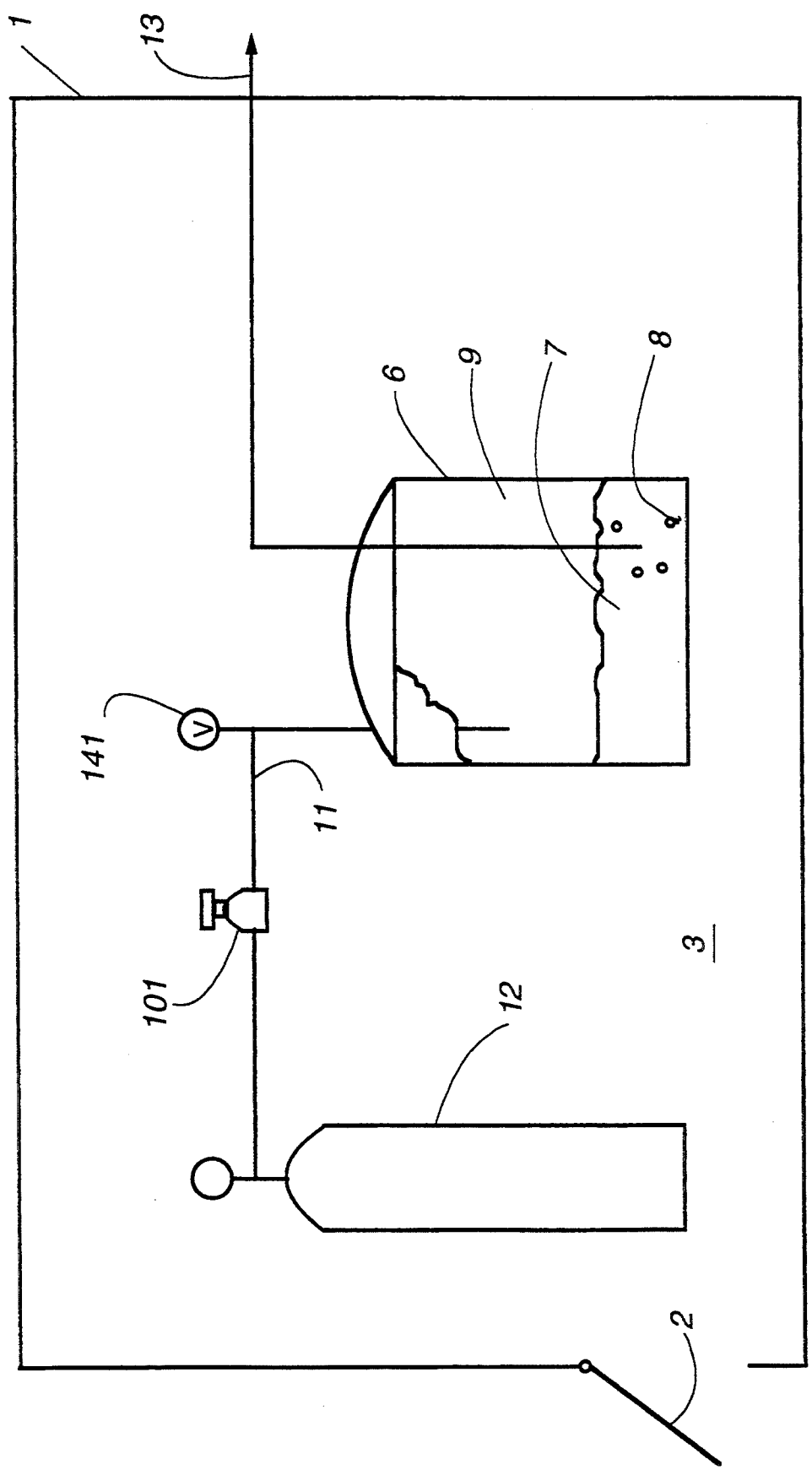
FIG. 3 is a block diagram of the cold storage room of FIG. 2, but with the installation of the present invention.

Referring next to FIG. 3 a temperature compensating pressure regulator (TCPR) 101 has replaced the computer 5, the temperature sensor 4 and the pressure sensor 14 of FIG. 2. The TCPR 101 performs the same tasks as these deleted items. The draught beer output 13 is the same. The pressure gauge 141 is merely an option to allow the visual inspection of the pressure in the pressure cavity 9.

The operation of the present invention depends upon several parameters in order to compensate for temperature changes in the environment. Since the function of the present invention is to change the pressure proportional to temperature fluctuations for any application, there is a direct correlation between the outside temperature and the internal control pressure of the keg. This correlation is dependent upon the makeup of the wax and the pressure control spring of the regulator. (FIG. 4, 50) The wax is composed of elements of copper and carbon. For the present beer application the wax is 90% (C12-C13-C14) polyolifin by volume and 82% copper by mass. These elements are bonded to give the proper thermal coefficients to compensate for the temperature variations in the environment. Also, the spring constant of the pressure control spring is temperature sensitive and is part of the correlation.

The following equation provides a thermodynamic approach for correlating the pressure and temperature variations of the present invention:

$$\Delta P = \Delta T C_1 \exp\left(\frac{\alpha_1 h_1}{k_1 R o_1}\right) + \frac{K_2}{L_2} \quad \text{equation (1)}$$

where,
$\alpha_1$ = thermal diffusivity of wax
$h_1$ = convection coefficient of wax
$k_1$ = thermal conductivity coefficient of wax
$R o_1$ = characteristic dimension of wax
$K_2$ = spring constant
$L_2$ = spring length
$C_1$ = correlation coefficient of wax This equation shows that as the temperature changes in the container, the wax and spring temperatures will change, activating the valve according to equation (1) to provide for an increase in the container pressure. This valve is unique in that the response is related to the physical characteristics of the valve, and not a sophisticated electronic feedback system. The regulator can be fitted for any application by adjusting the constants (through physical adjustments of the valve components) as shown in equation (1). Because of the simplicity and direct correlations of the parameters in the equation, the repeatability and accuracy of the regulator should be very good.

Figure 4:
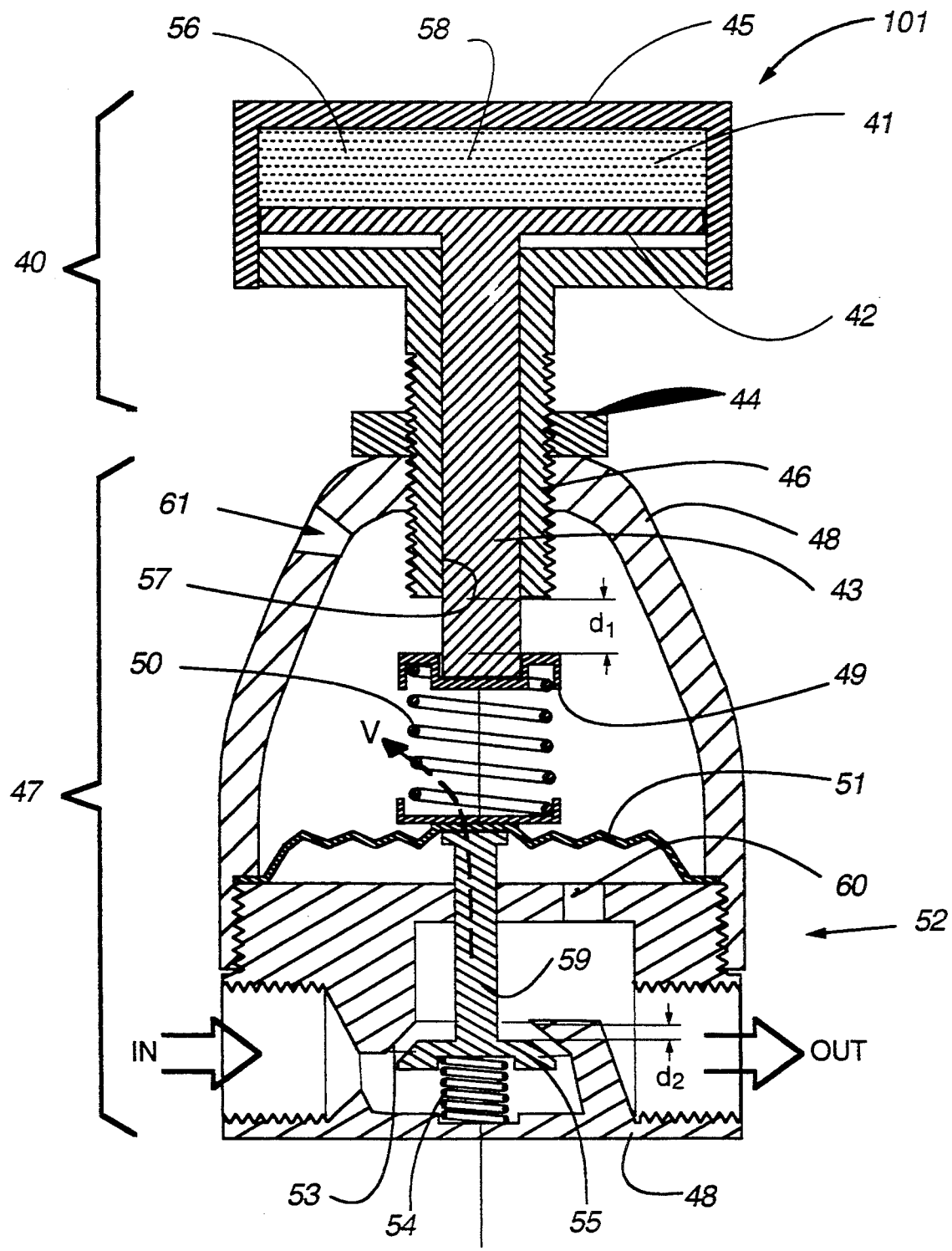
FIG. 4 is a longitudinal sectional view of the temperature compensating regulator 10 shown in FIG. 3.

Referring next to FIG. 4 the TCPR 101 is shown in an enlarged cross sectional view. A miniature regulator 47 has been modified to accept a temperature element 40. The miniature regulator 47 could be a Norgren ® Type R14. The Norgren ® Type R14 miniature regulator is designed for use with compressed gas. They are usually used for applications that require a constantly maintained reduced pressure. Applications usually include maintaining a 30 psig pressure to blow guns to meet OSHA requirements as well as machine installations requiring a set pressure that does not change with demand.

The miniature regulator 47 has been combined with a temperature element 40 having an outer case 45. A piston 42 is slidingly engaged inside the outer case 45. A wax 41 having copper impurities 56 is sealed between the outer case 45 and the piston 42. When the temperature of the ambient air 3 increases or decreases, it causes the wax 41/copper 56 to expand or contract accordingly. A piston rod 43 is thereby caused to move over a variable distance $d_1$. A pressure control spring 50 absorbs a selectable amount of the movement of the piston rod 43. Then the pressure control spring 50 transmits the movement of the piston rod 43 to the diaphragm 51. The diaphragm 51 is connected to the valve stem 59 which holds the valve plug 55 in the valve seat 53. The valve plug 55 moves over a distance $d_2$.

The inlet port is denoted as IN, and the output port is denoted as OUT. A spring guide 49 holds the pressure control spring 50 in place. A balancing spring 54 pushes the valve plug 55 back toward the closed position to reduce the output pressure when the ambient temperature decreases and causes the wax 41 to contract.

The segment 52 of the miniature regulator 47 is the pressure reducing valve. The bonnet 48 is the outer case of the miniature regulator 47. A lock nut 44 locks the temperature element 40 inside the miniature regulator 47. The piston rod guide 57 is part of the outer case 45. The top portion of the outer case housing the wax 41 is denoted as the upper cavity 58.

It can be seen that by varying the parameters of the impurities 56 content, and/or the composition of the impurities, and/or the tension of the pressure control spring that a range of temperature to pressure ratios can be created. Thus, the present invention teaches a general method to control pressure in response to varying temperatures. This method can be applied to a wide variety of applications including but not limited to beverage storage, volatile liquid storage, and liquid storage in outer space.

Figure 5:
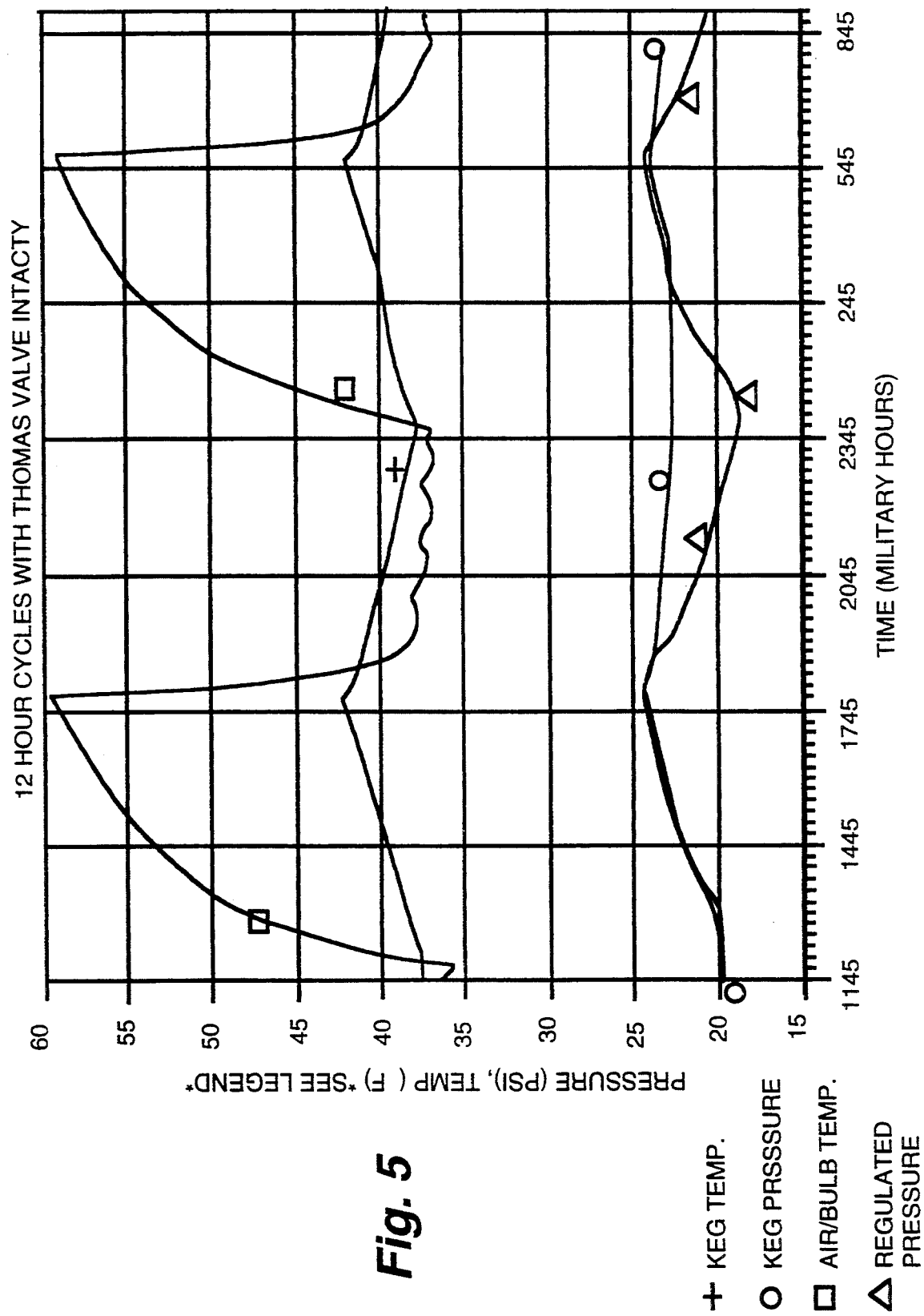
FIG. 5 is a chart of experimental results showing how the regulating valve maintains the proper pressure in response to ambient temperature changes.

Referring last to FIG. 5 the result of an experiment using the TCPR 101 is shown. A Thomas valve was used as a back flow preventor.

It can be seen that as the ambient air temperature "□" rose and fell over a twenty two hour period, the keg pressure "○" tracked the temperature changes in a predetermined manner so as to meet the beer manufacturer's standards for providing tasty, non-foaming beer.

Below follows the commercial installation and operation instructions for the TCPR 101:

The TCPR 101 has been designed to greatly reduce foam in beer caused by temperature fluctuations. The valve will automatically adjust the $CO_2$ supply pressure to the keg in relation to the temperature in the refrigeration unit. By following the instructions the valve should provide many years of trouble free operation. Please follow these instructions to insure proper installation.

CAUTION

Before starting make sure that the $CO_2$ shut off valve has been closed. DEATH BY ASPHYXIATION MAY OCCUR IF $CO_2$ IS ALLOWED TO ESCAPE.

PLACEMENT

For best results the valve should be mounted in an upright position with the dial face of the gauge in a readable location. Insure that the location is clear from moving items and that it is in a spot that is representative of the overall temperature of the refrigeration unit. This will normally be an area close to the keg. Do not place in an area where warm foods or supplies are normally stored. The supplied mounting bracket may be used to securely fasten the valve to the wall or other stable fixture.

HOOK UP

The TCPR 101 is designed to be used between the primary regulator and the keg. ¼" FNPT connections are supplied on the valve. After $CO_2$ has been shut off, use 2 ea. ¼" MNPT to barbed tube or similar fittings (not supplied) to install the TCPR 101 in the line between the primary regulator and the keg. Use TFE tape on any threads to prevent $CO_2$ leakage. Insure that the line is protected from any foreign object that may cut the tubing.

CALIBRATION

After installing the TCPR 101 in the $CO_2$ line, allow the valve to cool to normal refrigerator temperature. This will take about 20 to 30 minutes. The TCPR 101 WILL NOT OPERATE CORRECTLY UNLESS THIS IS DONE. Turn on the $CO_2$ supply and check for any leaks. Adjust the output supply pressure on the primary regulator to 30 psi. by following the manufacturers suggested operation instructions. The valve is now ready for calibration. DO NOT TOUCH THE TOP OF THE TCPR 101 as this will change the temperature calibration. Loosen the retainer nut on the temperature element and then adjust the output pressure by turning the element using the wrenching flats. The final setting should be that which is recommended by the brewer based on altitude and temperature for each name brand.

MAINTENANCE

The TCPR 101 should be maintenance free for many years with proper care. Do not spray with water or cleaners as this may inhibit the operation of the valve. Do not stack articles on or near valve.

KEY $d_1$—distance piston rod 43 travels
$d_2$—distance the valve plug 55 travels
1—walk-in refrigerator
2—door
3—ambient air in walk-in refrigerator
4—temperature sensor
5—computer
6—beer keg
7—beer
8—$CO_2$
9—pressure cavity regulating
10—pressure valve
11—$CO_2$ pipe
12—$CO_2$ tank
13—draught beer output
14—pressure sensor
40—temperature element
41—wax
42—piston
43—piston rod
45—outer case
47—miniature regulator
48—bonnet
49—spring guide
50—pressure control spring
51—diaphragm
52—pressure reducing valve
53—valve seat
54—balancing spring
55—valve plug
56—copper impurities
57—piston rod guide
58—upper cavity
59—valve stem
60—pressure balancing poof
61—vent hole through the bonnet
101—temperature compensating pressure regulator (TCPR)
141—pressure gauge
IN—inlet port
OUT—outlet port
V—direction of venting gas if output pressure increases

I claim:

1. A method for regulating the flow of a pressurized fluid responsive to temperature levels, said method comprising the steps of:
   applying the pressurized fluid to an inlet port of a valve member having a supportive bonnet positioned thereabout, the valve member also having an outlet port and a plug member positioned between the inlet port and the outlet port, the plug member being actuatable into positions alternately to block, or to permit, formation of a fluid connection between the inlet and outlet ports, respectively;

positioning a thermally-expansive material in an enclosure supported above the valve member to which the pressurized fluid is applied during said step of applying, the enclosure having a downwardly-extending cylindrical guide formed at a bottom portion thereof and positioned to extend into the bonnet, the thermally-expansive material being of volumetric dimensions proportional to varying temperature levels;

positioning a longitudinally-extending shaft member to extend through the cylindrical guide between the enclosure and the valve member, the shaft member being translatable in response to the changes the volumetric dimensions of the thermally-expansive material for causing actuation of the plug member into the positions alternately to block, or to permit, the formation of the fluid connection between the inlet and outlet ports of the valve member, wherein changes in the volumetric dimensions of the thermally-expansive material and the changes in the flow of the pressurized fluid through the valve member are linearly related thereby to regulate the flow of the pressurized fluid; and locking the enclosure in position together with the valve member.

2. A pressure regulator for regulating the flow of a pressurized fluid responsive to temperature levels, said pressure regulator comprising:

a valve member having an inlet port for receiving the pressurized fluid, an outlet port, and a plug member positioned between the inlet port and the outlet port, the plug member actuatable into position alternately to block, or to permit, formation of a fluid connection between the inlet and outlet ports, respectively;

a supportive bonnet positioned about said valve member;

an enclosure supported above said valve member, said enclosure for holding a thermally-expansive material therein, the thermally-expansive material varying in volumetric dimensions in proportion to the temperature levels, said enclosure having a downwardly-extending cylindrical guide formed at a bottom portion thereof and positioned to extend into said bonnet;

a longitudinally-extending shaft member positioned to extend through said cylindrical guide between said enclosure and said valve member, said longitudinally-extending shaft member being translatable in response to changes in the volumetric dimensions of the thermally-expansive material for causing movement of the plug member between positions alternately blocking, or permitting, the formation of the fluid connection between the inlet and outlet ports of said valve member, thereby to regulate the flow of the pressurized fluid wherein changes in the volumetric dimensions of the thermally-expansive material and the changes in the flow of the pressurized fluid through said valve member are linearly related; and a locking element positioned about the cylindrical guide of said enclosure, said locking element for locking said enclosure in position together with said valve member.

3. The pressure regulator of claim 2 wherein said valve member further comprises a valve stem for moving the plug member into the positions alternately to block, or to permit, the formation of the fluid connection.

4. The pressure regulator of claim 3 wherein the thermally-expansive material held within said enclosure comprises a wax material.

5. The pressure regulator of claim 3 wherein said longitudinally-extending shaft member comprises a piston rod of a piston, the piston further having a piston head positioned within the enclosure.

6. The pressure regulator of claim 5 further comprising a spring member positioned beneath an end portion of the piston rod wherein the end portion of the piston rod abuts against the spring member.

7. The pressure regulator of claim 6 further comprising a diaphragm, said diaphragm positioned between said spring member and the valve stem of said valve member wherein translation of the piston rod responsive to thermal expansion of the thermally-expansive material held within said enclosure is transmitted through said spring member and said diaphragm to the valve stem to cause movement of the plug member of said valve member.

8. In a pressure regulating system having a fluid tank including an interior cavity maintained under pressure by application of a pressurized gas stored in a pressure tank in selective communication with the interior cavity of the fluid tank, a combination with the fluid tank and the pressure tank of a pressure regulator positioned between the fluid tank and the pressure tank, said pressure regulator comprising:

a valve member having an inlet port for receiving the pressurized fluid, an outlet port, and a plug member positioned between the inlet port and the outlet port, the plug member actuatable into position alternately to block, or to permit, formation of a fluid connection between the inlet and outlet ports, respectively;

a supportive bonnet positioned about said valve member;

an enclosure supported above said valve member, said enclosure holding a thermally-expansive material therein, the thermally-expansive material being of volumetric dimensions proportional to varying temperature levels, said enclosure having a downwardly-extending cylindrical guide formed at a bottom portion thereof and positioned to extend into said bonnet;

a piston rod having a piston head and a piston shaft, the piston head positioned within said enclosure and the piston shaft positioned to extend through said cylindrical guide between said enclosure and said valve member, said piston being translatably responsive to changes in the volumetric dimensions of the thermally-expansive material for causing actuation of the plug member into the positions alternately to block, or to permit, the formation of the fluid connection between the inlet and outlet ports of said valve members, thereby to regulate the flow of the pressurized fluid wherein changes in the volumetric dimensions of the thermally-expansive material and the changes in the flow of the pressurized fluid through said valve member are linearly related; and a locking element positioned about the cylindrical guide of said enclosure, said locking element for locking said enclosure in position together with said valve member.

* * * * *